United States Patent

[11] 3,629,909

| [72] | Inventor | William J. Riley |
| | | 4728 Millcreek Road, Dallas, Tex. 75234 |
| [21] | Appl. No. | 16,428 |
| [22] | Filed | Mar. 4, 1970 |
| [45] | Patented | Dec. 28, 1971 |

[54] DROP WIRE CLAMP
6 Claims, 12 Drawing Figs.

[52] U.S. Cl. .................................................. 24/126, 24/130
[51] Int. Cl. ..................................................... F16g 11/02
[50] Field of Search ........................................... 24/25, 126 R, 136 R, 170, 194; 339/247, 273; 52/711

[56] References Cited
UNITED STATES PATENTS

| 656,993 | 8/1900 | Mossman | 24/136 R |
| 824,556 | 6/1906 | Lowry et al. | 24/136 R |
| 2,220,203 | 11/1940 | Branin | 24/126 R |
| 3,424,038 | 1/1969 | Smith | 24/126 R |

*Primary Examiner*—Bobby R. Gay
*Assistant Examiner*—Darrell Marquette
*Attorney*—Kingsland, Rogers, Ezell, Eilers & Robbins ABSTRACT: A wire clamp of plastic in which the housing is provided having a wedge-shaped slotlike opening receiving a plastic insert having a conforming wedge-shaped exterior with the housing and an elongated slotlike opening within which a wire is received with the walls forming the opening being depressable or clampable together as the wedge-shaped insert is pressed into the housing. The insert is made of plastic and may be of different sizes and forms to receive different types of wire and may be further provided with cast-in teeth in the plastic insert walls forming the slotlike opening to bear against the plastic coating used in electrical wires and the like. Keyway means are provided for the insert and the housing for registration and locking of the two together.

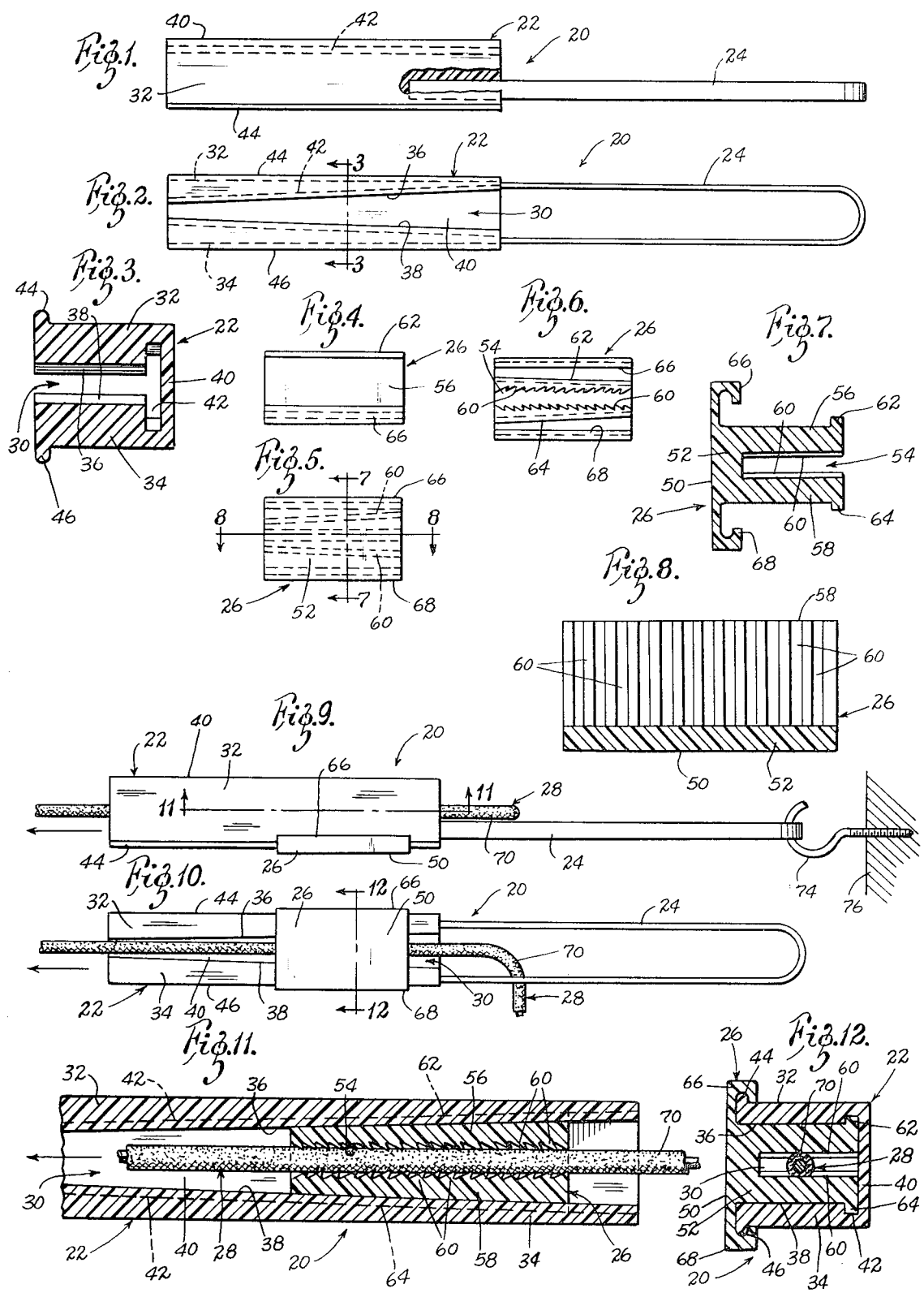

DROP WIRE CLAMP

BACKGROUND OF THE INVENTION

In the past, drop wire clamps for clamping electrical installation wire and the like have been provided. Such clamps have generally been made of a metallic construction and have been expensive and relatively limited to accommodate only a certain type of wire. For different sizes or types of wire entire new clamps have been required. It is the purpose of this invention to provide a low-cost plastic drop wire clamp which can accommodate different types of electrically insulated wires with an improved gripping action and which can be used in a wide variety of installations.

SUMMARY OF THE INVENTION

By means of the instant invention there has been provided a relatively inexpensive plastic drop wire clamp which can be used in a variety of installations using different types of electrical wiring having conventional plastic insulation coverings. Such wires can be of different sizes and different cross sections such as circular, flat, oval, and the like.

The drop wire clamp comprises a plastic housing having an elongated slotlike opening within which is fitted a wedge-shaped plastic insert engageable with conforming interior wedge-shaped sides in the slotted opening in the housing. The wedge-shaped insert, likewise, has a slotted opening which has generally parallel sides formed by walls which define the opening and which are deformable and moveable together as the insert is moved into the housing such that a wire when loosely received therein is tightly gripped by the walls of the insert. The insert is further provided with teeth formed into the interior wall surfaces forming the slotted opening and which are pointed in a direction opposing the tension that is applied on the wire so that the teeth dig in or more tightly grip the plastic as the wire is tended to be pulled away from the clamp due to a load being placed upon it.

The insert and the housing are provided with mating keyway means for proper registry of the insert within the housing and as a locking means to prevent the pulling away or disengagement of the insert from the housing. A wire or plastic hook or handle is cast into the plastic housing in order that the entire drop wire clamp can be suspended from any anchoring position such as from the ceiling or the like.

The above features are objects of this invention and further objects will appear in the detailed description which follows and will otherwise be apparent to those skilled in the art.

For the purpose of illustration of this invention, there is shown in the accompanying drawings a preferred embodiment thereof. It is to be understood that these drawings are for the purpose of illustration only and that the invention is not limited thereto.

BRIEF DESCRIPTION OF THE DRAWINGS

FIG. 1 is a view in side elevation of the drop wire clamp with a portion broken away in section showing the insertion of the wire or plastic hook in the housing;

FIG. 2 is a top plan view of the housing with the insert removed;

FIG. 3 is a view in section taken on the line 3—3 of FIG. 2;

FIG. 4 is a view in side elevation of the insert;

FIG. 5 is a top plan view of the insert;

FIG. 6 is a bottom plan view of the insert;

FIG. 7 is an enlarged view in section taken on the line 7—7 of FIG. 5;

FIG. 8 is an enlarged view in section taken on the line 8—8 of FIG. 5;

FIG. 9 is a view in side elevation of the drop wire clamp showing the insert in the housing and the drop wire clamp in use;

FIG. 10 is a top plan view of the drop wire clamp in use;

FIG. 11 is an enlarged view in section taken on the line 11—11 of FIG. 9;

FIG. 12 is an enlarged view in section taken on the line 12—12 of FIG. 10;

DESCRIPTION OF THE INVENTION

The drop wire clamp of this invention is generally defined by the reference numeral 20 and is best shown in FIGS. 9, 10, 11, and 12. As there shown, it includes a plastic housing 22 which receives a cast-in place metallic or plastic hook 24, a wedge-shaped insert 26 receivable within the housing so as to clamp an electrical wire 28 firmly in place.

The housing 22 is best shown in FIGS. 1, 2, and 3. It is formed having a generally wedge-shaped opening 30 and has a generally U-shaped cross section as shown in FIG. 3. This construction is provided by sidewalls 32 and 34 which have generally converging wedge-shaped interior faces 36 and 38 and a bottom wall 40. A transverse slot 42 is provided at the bottom of the housing as part of a keyway receiving corresponding flanges in the insert as will be further described. At the top-retaining flanges 44 and 46 are provided on the sidewalls of the housing as an additional keyway means with the insert as will be more fully described. The housing is adapted to be hung to an anchoring position by the metallic or plastic hook or handle 24 which is cast into the plastic housing in its formation as shown in FIG. 1.

The wedge-shaped plastic insert 26 is best shown in FIGS. 4 and 8. As there shown, it has a generally tee-shaped configuration formed by a top surface 50 and a body portion 52. The body 52 is bifurcated with a wire-receiving slot 54 comprised by sidewalls 56 and 58. The exterior surfaces of the walls 56 and 58 are wedge-shaped and are receivable in mating relation within the slot 30 formed by the interior walls 36 and 38 of the housing. The slot 54 has parallel inside wall surfaces which as best shown in FIG. 6 are formed into angled teeth 60 which are pointed at an oblique angle away from the converging direction of the wedge-shaped sides to provide for a better gripping or digging in action into the wire insulation as the sidewalls are deformed and compressed together in the wedging and clamping action on the wire. The interior walls may where desired be each provided with longitudinal grooves to provide a round opening for the reception of coaxial cables. The bottom of the walls 56 and 58 as best shown in FIG. 7 is provided with flanges 62 and 64 which form part of the keyway mating with the slot 42 at the bottom of the housing. The top 50 of the insert is likewise provided with L-shaped bent-over flange elements 66 and 68 which receive the retaining flanges 44 and 46, respectively, at the top of the housing. The interfitting relationship of the keyways and the relationships with the insert in the housing are best shown in the cross section of FIG. 12.

USE

The drop wire clamp of this invention is very simply adapted for use by merely placing the wire 28 having a deformable plastic coating or the like 70 in the slot 54 of the wedge-shaped insert. After this has been effected, the insert is then moved with its smaller end into the larger part of the opening 30 in the general direction of the arrow shown at the right-hand portion of FIG. 11. The insert is moved as far into the wedged-shaped opening of the housing as can be effected by hand with the registration of the flanges 62 and 64 in the bottom slotlike opening 42 of the housing and the flanges 66 and 68 receiving the flanges 44 and 46 on the housing to provide for registration and locking of the insert and the housing together.

After the initial installation, the wire 28 may be pulled in the direction of the arrow shown in the left-hand portion of FIG. 11 or conversely the entire clamp may be moved to the right so that the wedge-shaped insert is wedged as far as possible into the housing. In this operation, the deformable sidewalls 56 and 58 due to the wedging action will be compressed together to grip the sides of the wire and the teeth 60 will bite or dig into the plastic installation on the sides of the wire firmly positioning and clamping the wire in the clamp. The entire clamp unit may then be suspended from a hook 74 such as shown in FIG. 9 which is attached to a ceiling 76 or any other anchoring means may be employed. The drop wire clamp will then firmly clamp the wire and resist any further movement of the wire in the direction of the arrow shown at the left-hand portion of FIG. 11 so that a firm anchoring is provided.

Various changes and modifications may be made within this invention as will be readily apparent to those skilled in the art. Such changes and modifications are within the scope and teaching of this invention as defined by the claims appended hereto.

What is claimed is:

1. A wire clamp comprising a U-shaped housing having a wedge-shaped slotlike opening therein, a plastic insert having a wedge-shaped exterior insertable in mating relation in the wedge-shaped opening in the housing, said insert being U-shaped and having an elongated slotlike opening receiving a wire therein with deformable sidewalls bounding said slotlike opening being adapted to be bent toward each other to constrict and bear tightly against the wire in gripping relation as the insert is moved in wedging relation into the housing.

2. The wire clamp of claim 1 in which the interior sides of the plastic insert are provided with deformable plastic teeth adapted to bear against the sides of the wire.

3. The wire clamp of claim 1 in which the housing is made of plastic and the insert is made of integral plastic material with deformable plastic teeth cast on the interior sides of the insert adapted to bear against the side of the wire.

4. The wire clamp of claim 1 in which the plastic insert slotlike opening has a width loosely receiving the wire and is removably interchangeable with plastic inserts having different opening widths to receive different sized wires.

5. The wire clamp of claim 1 in which longitudinal keyway means are provided for locking engagement of the insert in the housing, said keyway means composing bentover flanges extending from the sides of the insert which receive in mating relation laterally extending flanges connected to the sides of the housing, said insert flanges acting as restraining means to resist spreading apart of the housing as the insert is wedged into it.

6. The wire clamp of claim 3 in which a hook is cast into the plastic housing.

* * * * *